United States Patent
Min et al.

(10) Patent No.: US 8,345,064 B2
(45) Date of Patent: Jan. 1, 2013

(54) METHOD AND SYSTEM FOR TILE BINNING USING HALF-PLANE EDGE FUNCTION

(75) Inventors: Kyoung June Min, Yongin-si (KR); Jeong Wook Kim, Yongin-si (KR); Dong Soo Kang, Yongin-si (KR); Suk Jin Kim, Yongin-si (KR); Hee Seok Kim, Yongin-si (KR); Seok Yoon Jung, Yongin-si (KR); Sang Oak Woo, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1226 days.

(21) Appl. No.: 11/604,691

(22) Filed: Nov. 28, 2006

(65) Prior Publication Data
US 2008/0018664 A1    Jan. 24, 2008

(30) Foreign Application Priority Data
Jul. 20, 2006  (KR) .................. 10-2006-0067857

(51) Int. Cl.
*G09G 5/00*  (2006.01)
(52) U.S. Cl. .................. 345/619; 345/423
(58) Field of Classification Search .......... 345/619, 345/423
See application file for complete search history.

(56) References Cited

U.S. PATENT DOCUMENTS

| 5,369,739 | A | 11/1994 | Akeley |
| 6,437,780 | B1 | 8/2002 | Baltaretu et al. |
| 6,900,800 | B2 | 5/2005 | Baldwin |
| 6,975,318 | B2 | 12/2005 | Junkins et al. |
| 2001/0040583 | A1 | 11/2001 | Yue et al. |
| 2004/0160450 | A1 | 8/2004 | Doyle |
| 2004/0227772 | A1* | 11/2004 | Huang et al. .......... 345/622 |
| 2005/0134603 | A1 | 6/2005 | Iourcha et al. |

FOREIGN PATENT DOCUMENTS

| JP | 2001-283242 A | 10/2001 |
| KR | 10-2002-7013055 A | 1/2003 |
| KR | 10-2003-0005251 A | 1/2003 |
| WO | 94/10647 A1 | 5/1994 |
| WO | 00/10372 A2 | 3/2000 |
| WO | 01/37220 A1 | 5/2001 |
| WO | 2006/056806 A1 | 6/2006 |

OTHER PUBLICATIONS

Communication from JP Patent Office Sep. 16, 2009.

* cited by examiner

*Primary Examiner* — Maurice L McDowell, Jr.
(74) *Attorney, Agent, or Firm* — Sughrue Mion, PLLC (57) ABSTRACT

A tile binning method including: dividing a scene for rendering a triangle, into a plurality of tiles; determining identification values of tile nodes of each of the tiles; and identifying a tile including an entirety or a part of the triangle from the tiles, based on the identification value of the tile nodes for each of the tiles.

14 Claims, 9 Drawing Sheets

METHOD AND SYSTEM FOR TILE BINNING USING HALF-PLANE EDGE FUNCTION

CROSS-REFERENCE TO RELATED APPLICATIONS

This application claims priority from Korean Patent Application No. 10-2006-0067857, filed on Jul. 20, 2006, in the Korean Intellectual Property Office, the disclosure of which is incorporated herein by reference.

BACKGROUND OF THE INVENTION

1. Field of the Invention

The present invention relates to a tile binning method and system using a half plane edge function, and more particularly, to a method and system in which a scene for performing three-dimensional rendering of a triangle is divided into a plurality of tiles and a tile including an entirety or a part of the triangle is identified to perform the rendering with respect to only the tile including the entirety or the part of the triangle, from the divided tiles.

2. Description of the Related Art

Currently, as the performance capability of portable terminals improves, the instances of providing information using three-dimensional graphics are increasing. Though three-dimensional graphics could be used in only a computer terminal in the past, as the performance capability of portable terminals such as a mobile phone, a personal data assistant (PDA), or a navigation device, improves, three-dimensional graphics may be used in these portable terminals. When using three-dimensional graphics, even a two-dimensional display device may more realistically express a three-dimensional model.

However, when a three-dimensional model is expressed by using three-dimensional graphics, since the display device shows a two-dimensional scene to a user, a process of converting a three-dimensional model into the two-dimensional scene viewed by the user, is required. The process of converting the three-dimensional model into a two-dimensional scene by generating a three-dimensional model converted into two-dimensional coordinates and displayed in the form of a vector, as a pixel-based two-dimensional scene, is called rasterization. In rasterization, the two-dimensional scene based on a triangle that is a basic unit of the three-dimensional model is generated.

According to a conventional method, each of triangles that have to be processed in the rasterization process is processed with respect to an entire scene, and a frame buffer (a color buffer+Z buffer) having the same size of scene resolution is required. In this case, since it is difficult to embed the frame buffer in a chip, due to the size of the frame buffer, access is performed via random external memory. Since the external memory access consumes approximately ten times the amount of power of an on-chip memory access, it becomes an important to reduce a frequency of external memory access in a mobile environment. Accordingly, a tile-based three-dimensional rendering method is developed to solve the problem of the conventional method.

Figure 1:
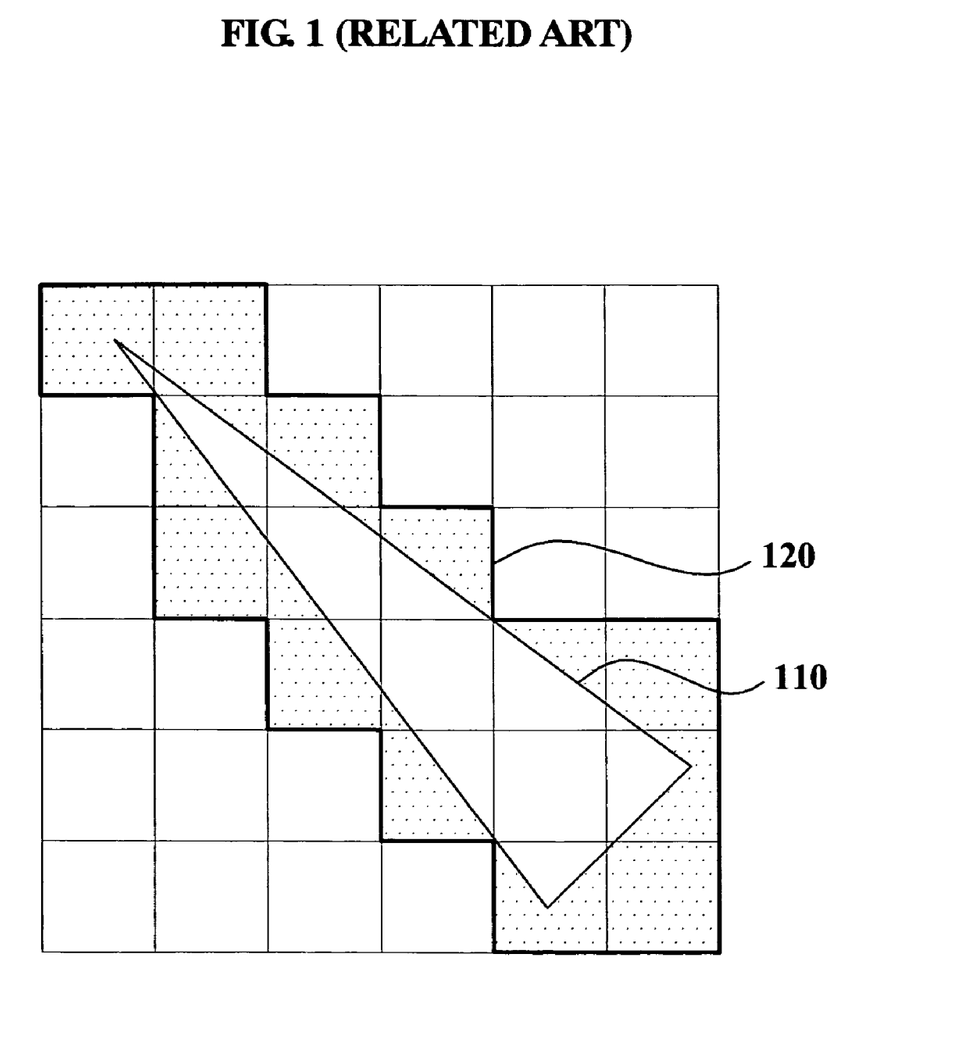
FIG. 1 is a diagram illustrating a related art tile-based three-dimensional rendering method.

FIG. 1 is a diagram illustrating a related art tile-based three-dimensional rendering method. Referring to FIG. 1, tiles 120 include an entirety or a part of a triangle 110, and other tiles do not include any part of the triangle 110. In this case, rendering with respect to one tile is performed by using a frame memory having a size of one tile resolution embedded in a chip. When the rendering with respect to one tile is completed, it may be transmitted to a tile position of an external frame buffer at one time in a burst mode. According to the tile-based rendering method, since there is not frequent external frame buffer memory access and one effective external burst memory access performed, it is very advantageous from a low power driving perspective.

To perform the tile-based three-dimensional rendering method, the tiles 120 including the entirety or the part of the triangle 110 must be identified, which is called tile binning. However, tile binning is not required in existing rendering methods and causes heavy loads in the tile-based three-dimensional rendering method. It is also very difficult to precisely identify the entirety or the part of the triangle 110. Accordingly, a method capable of precisely identifying the tiles 120 including the entirety or the part of the triangle 110 is required.

Figure 2:
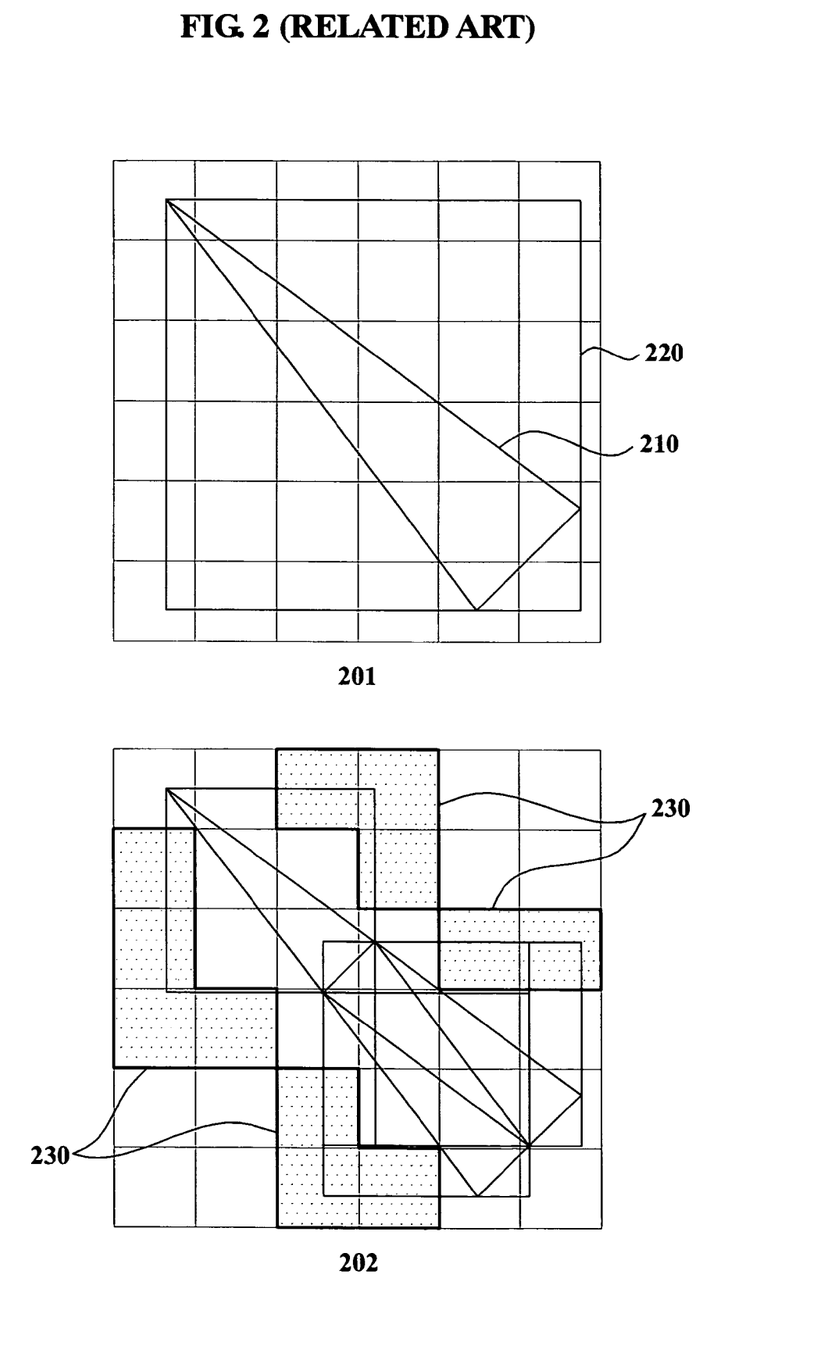
FIG. 2 is a diagram illustrating a related art tile binning method using division.

FIG. 2 is a diagram illustrating a related art tile binning method using division. The conventional tile-binning method using division is designed to quickly identify tiles including an entirety or a part of a triangle 210. Referring to FIG. 2, a minimal square 220 including the triangle 210 is acquired as shown in grid 201. When a size of the minimal square 220 is greater than a predetermined threshold, as shown in grid 202, the triangle 210 is divided into four triangles, by connecting middle points of three edges of the triangle 210 and minimal squares including each of the divided triangles are acquired. The above process is repeated until the size of each of the minimal squares is smaller than the threshold. When the size of the minimal square is smaller than the threshold, tiles including the squares are identified as tiles including the entirety or the part of the triangle 210.

However, according to the above method, as shown in 202, tiles 230 identified as the tiles including the entirety or the part of the triangle 210 that actually do not include any part of the triangle 210 may exist. Therefore, completely precise processing cannot be expected. Also, since a number of triangles is increased by a factor of four for each step, when a size of a triangle is great and there are many steps, the number of triangles is increased according to a geometric progression $4^n$, thereby decreasing operation speed and becoming very slow. A process of rearranging newly generated fixed points in the form of a triangle may be an additional overhead in an embodiment, unlike the simplicity of the algorithm itself.

Accordingly, when there is a method capable of precisely identifying tiles including an entirety or a part of a triangle and expecting a certain performance regardless of a form or a size of the triangle, a tile binning method may be more efficiently performed.

SUMMARY OF THE INVENTION

The present invention provides a method and system capable of precisely identifying a tile including an entirety or a part of a triangle by using a half plane edge function.

According to an aspect of the present invention, there is provided a tile binning method including: dividing a scene for rendering a triangle into a plurality of tiles; determining identification values of tile nodes of each of the tiles; and identifying a tile including an entirety or a part of the triangle from the tiles, based on the identification value of the tile nodes for each of the tiles.

According to another aspect of the present invention, there is provided a tile binning system including: a tile division unit dividing a scene for rendering a triangle into a plurality of tiles; an identification value determination unit determining identification values of tile nodes of each of the tiles; and a tile identification unit identifying a tile including an entirety or a part of the triangle from the tiles, based on the identification value of the tile nodes for each of the tiles.

BRIEF DESCRIPTION OF THE DRAWINGS

The above and/or other aspects of the present invention will become apparent and more readily appreciated from the following detailed description of exemplary embodiments, taken in conjunction with the accompanying drawings of which.

DETAILED DESCRIPTION OF THE EXEMPLARY EMBODIMENTS

Reference will now be made in detail to exemplary embodiments of the present invention, which are illustrated in the accompanying drawings, wherein like reference numerals refer to the like elements throughout. The exemplary embodiments are described below to explain the present invention by referring to the figures.

Figure 3:
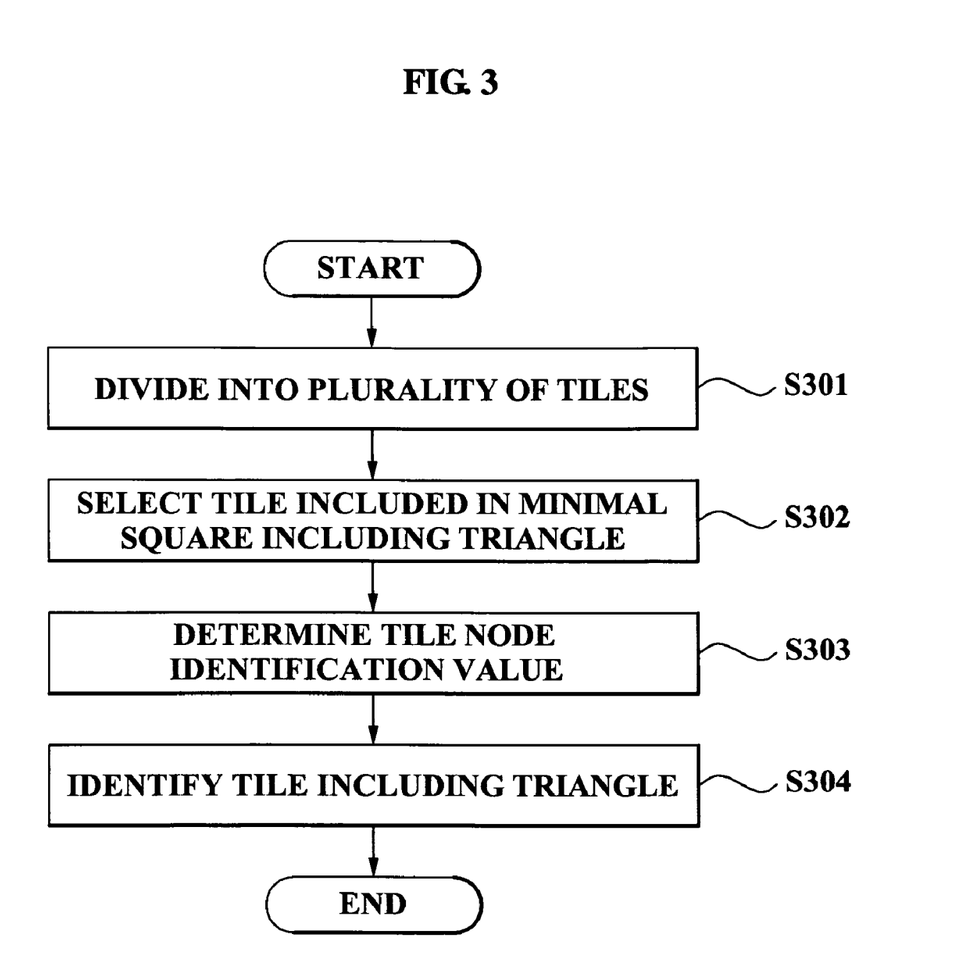
FIG. 3 is a flowchart illustrating a tile binning method according to an exemplary embodiment of the present invention.

FIG. 3 is a flowchart illustrating a tile binning method according to an exemplary embodiment of the present invention. The tile binning method according to an exemplary embodiment of the present invention will be generally described here, and will be described in detail by referring to FIGS. 4 through 7.

In operation S301, a scene for performing rendering with respect to a triangle is divided into a plurality of tiles. The tile is acquired by dividing the scene into a predetermined resolution that will be displayed to a user. Rendering with respect to an entirety of the scene may be performed by performing a rendering for each tile. For example, dividing a scene having a resolution of 640×480 into 32×32 tiles, and 20×15 tiles are used for the rendering. As described above, when dividing the entirety of the scene into a plurality of tiles, the rendering with respect to the entirety of the scene may be processed by performing the rendering with respect to each of the tiles whose resolution is low.

In operation S302, a tile included in a range of a minimal square including the triangle is identified from the tiles acquired by the dividing in operation S301. From the tiles acquired by the dividing in operation S301, a tile to which the rendering is performed includes the entirety or the part of the triangle. Accordingly, since a minimal square has more definition than a triangle, the range of the minimal square may be easily identified. Accordingly, before identifying the tile including the entirety or the part of the triangle, the minimal square including the triangle is acquired and a tile included in the range of the minimal square is identified, thereby reducing a number of tiles that become an object of a tile binning process. A method of acquiring the minimal square will be described in detail referring to FIG. 4.

In operation S303, an identification value of a node of each of the tiles selected in operation S302 is determined. The tile node may be a vertex of the tile, and the identification value enables a checking of where the tile node exists, based on the triangle. Accordingly, when determining the identification values in operation S303, information on where each of four vertexes of the tile exists based on the triangle may be obtained, thereby verifying whether each of the tiles includes the entirety or the part of the triangle.

The identification values determined in operation S303 may include a first identification value, a second identification value, and a third identification value. The first identification value, the second identification value, and the third identification value may be determined based on a sign of a half plane edge function of the tile node with respect to a first edge, a second edge, and a third edge of the triangle. For example, when a value of the half plane edge function is a positive number, the first identification value, the second identification value, and the third identification value may be determined to be 1, and when a value of the half plane edge function is a negative number or 0, the first identification value, the second identification value, and the third identification value may be determined to be 0. In this case, different values may be established as the positive number, the negative number, and 0, respectively. As described above, the identification value may be recorded by any one of methods capable of verifying the sign of the half plane edge function with respect to three edges of the triangle at each of the tile nodes.

The half plane edge function used for determining the identification value in operation S303 indicates a relationship between a line and a point, and is calculated by Equation 1 below.

$$\Delta x = (x1 - x0)$$

$$\Delta y = (y1 - y0)$$

$$E(x,y) = (x - x0) * \Delta y - (y - y0) * \Delta x \qquad \text{[Equation 1]}$$

In this case, (x0, y0) and (x1, y1) indicate endpoints of the line, and (x, y) indicates coordinates of the point. A value of E(x, y) becomes the half plane edge function. The half plane edge function value has a negative value when the point exists on a left side of the line and has a positive value when the point exists on a right side of the line. Since (x0, y0) and (x1, y1) indicate a direction of the line, a direction of each of the edges of the triangle is determined clockwise around the triangle. While the direction may be different depending on embodiments, each of the edges must have a direction mutually one after another to make the first identification value, the second identification value, and the third identification value of the tile node in the triangle be the same.

Also, the half plane edge function has a property shown in Equation 2.

$$E(x+1, y) = E(x, y) + \Delta y$$

$$E(x-1,y)=E(x,y)-\Delta y$$

$$E(x,y+1)=E(x,y)-\Delta x$$

$$E(x,y-1)=E(x,y)+\Delta x \quad \text{[Equation 2]}$$

Equation 2 may be easily derived from Equation 1. Also, when using a property of Equation 2, a process of operating the half plane edge function value with respect to a point moving vertically or horizontally to a predetermined line may be largely reduced. Since the half plane edge function value is regularly increased or decreased when moving vertically or horizontally in the same direction, when the half plane edge function value is changed from negative to positive in the direction of increase, all points after the change have a positive value, and when the half plane edge function value is changed from positive to negative in the direction of decrease, all points after the change have a negative number.

In operation S304, the tile including the entirety or the part of the triangle is identified from the tiles, based on the identification value of each of the tile nodes, determined in operation S303. Since information on a position of the tile node may be verified based on the triangle, by using the identification value of the tile node that is determined in operation S303, whether the tile includes the entirety or the part of the triangle may be identified by using the information on the position of the tile node that is a vertex of the tile.

For example, when the identification value of the tile node is determined based on the sign of the half plane edge function value in operation S303, when the first identification values of the tile nodes that are four vertexes of the tile are the same, the first edge is not included in the tile because the four vertexes of the tile exist in the same direction based on the first edge. Accordingly, when the first identification values of the tile nodes of the tile are the same, the second identification values are the same, and the third identification values are the same, the tile does not include the first edge, the second edge, or the third edge of the triangle. Accordingly, in this case, the tile exists in the triangle or out of the triangle. However, when calculating the half plane edge function value while a direction of each of the edges of the triangle is clockwise, each of the first identification value, the second identification value, and the third identification value of the tile node must be positive numbers to exist in the triangle.

Also, in operation S304, since any one of the edges is included in the tile when the first identification value, the second identification, or the third identification value of each of the tile nodes of the tile is different from others, the tile includes the part of the triangle. Tiles excluding the tile having first identification values of tile nodes that are identical, the second identification values that are identical, and third identification values that are identical and at least one of the first identification value, the second identification value, and the third identification value of one of the tile nodes being a negative number, may be identified as the tile including the entirety or the part of the triangle. When the identification value of the tile node of each of the tiles is determined, since the above comparison process can be performed sequentially, operation time may be largely reduced.

As described above, when the first identification value, the second identification value, and the third identification value of all of the tile nodes included in the tile are positive numbers, since the tile nodes are included in the triangle and are four vertexes of the tile, it may be determined that an entirety of the tile is included in the triangle.

Figure 4:
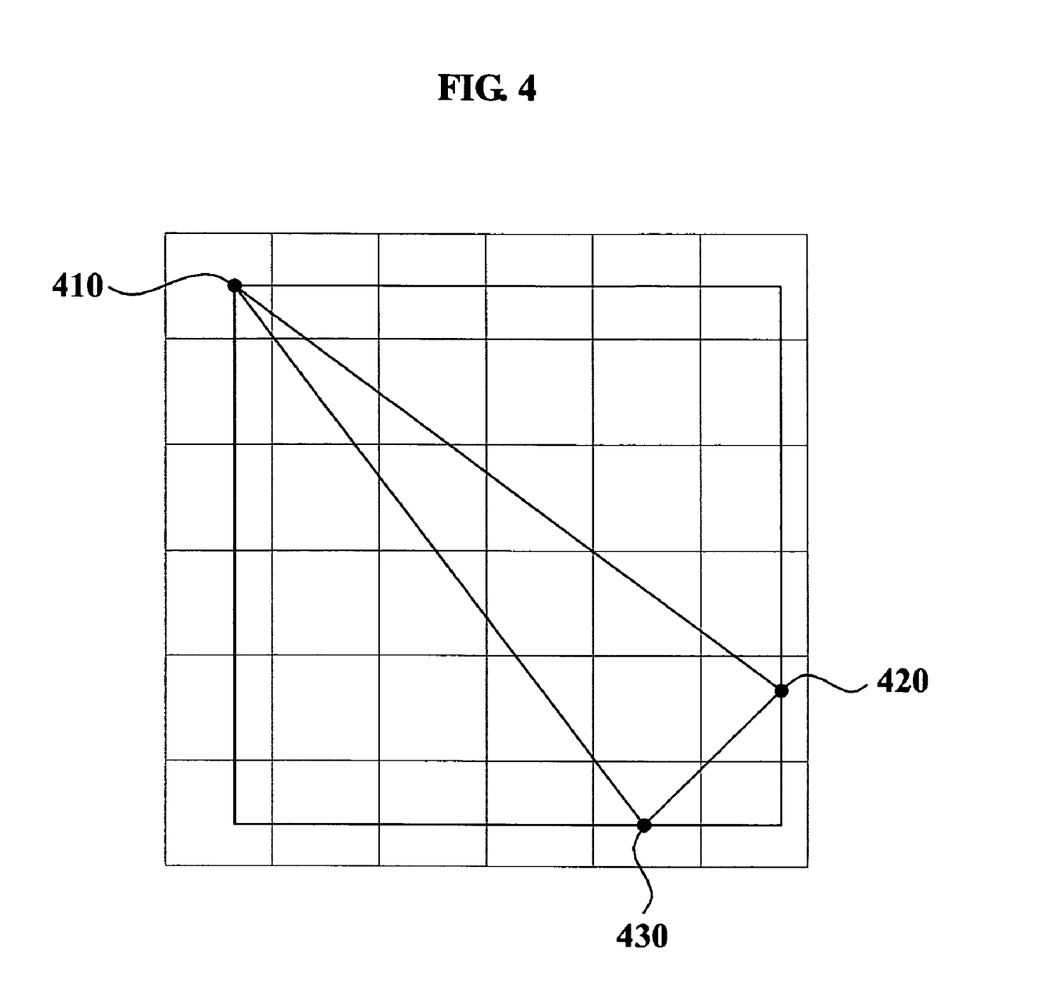
FIG. 4 is a diagram illustrating an example of a method of acquiring a minimal square including a triangle, in the tile binning method according to an exemplary embodiment of the present invention.

FIG. 4 is a diagram illustrating an example of a method of acquiring a minimal square including a triangle, in the tile binning method according to an exemplary embodiment of the present invention. Referring to FIG. 4, there are three vertexes 410, 420, and 430 of a triangle. To acquire a minimal square including the triangle, coordinates of the three vertexes 410, 420, and 430 of the triangle may be used. When a minimum value and a maximum value of an x coordinate and a minimum value and a maximum value of a y coordinate from the coordinates of the three vertexes 410, 420, and 430 are acquired, a square included in a range of the x coordinate and the y coordinate is the minimal square including the triangle. For example, when the coordinates of the vertex 410 are (3, 2), the coordinates of the vertex 420 are (19, 16), and the coordinates of the vertex 430 are (16, 19), a minimum value of the x coordinates of the three vertexes 410, 420, and 430 is 3 and a maximum value of the x coordinates of the three vertexes 410, 420, and 430 is 19 and a minimum value of the y coordinates of the three vertexes 410, 420, and 430 is 2 and a maximum value of the y coordinates of the three vertexes 410, 420, and 430 is 19. Accordingly, a square whose coordinates of vertexes are (3, 2), (19, 2), (3, 19), and (19, 19) may be the minimal square including the triangle. In addition, any one of various methods of acquiring a minimal square including a triangle may be applied to the present invention. The scope of the present invention may not be limited to the method of acquiring a minimal square.

Figure 5:
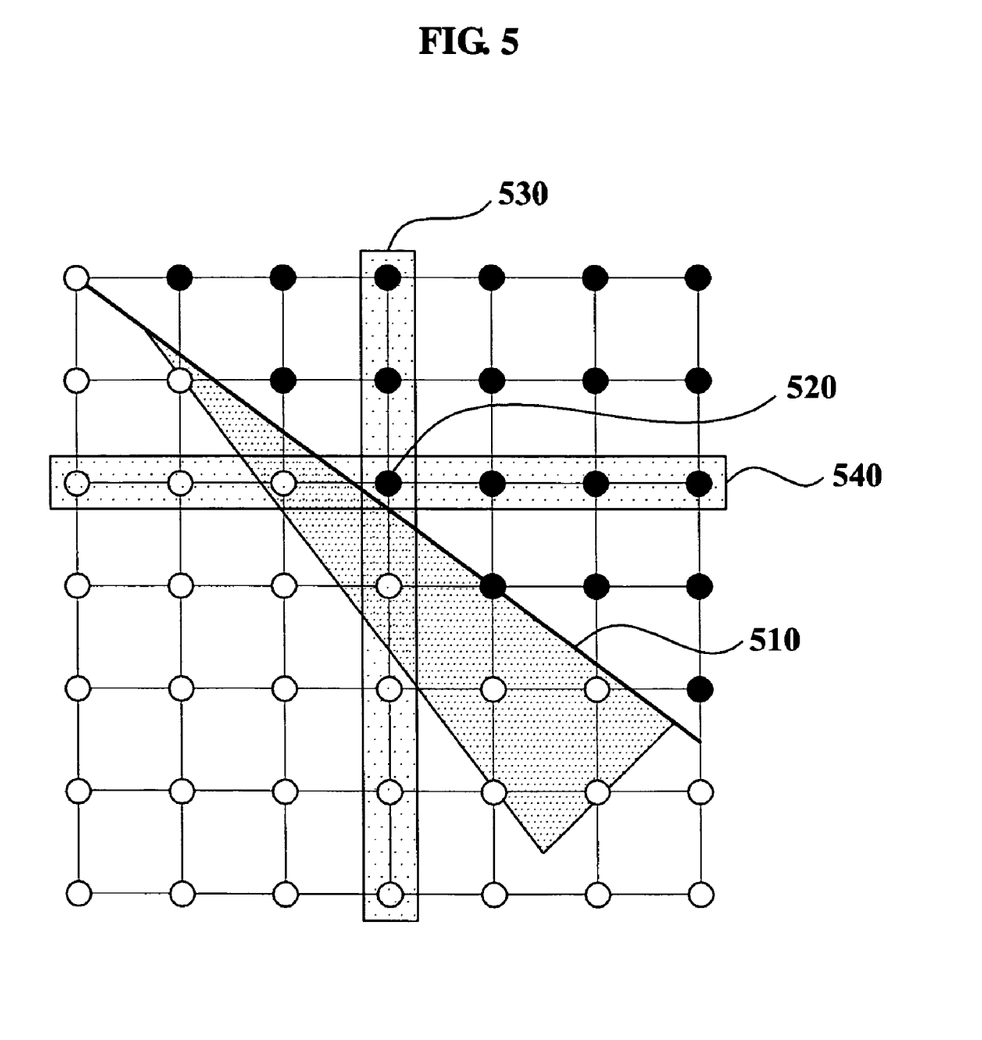
FIG. 5 is a diagram illustrating an example of a method of calculating a half plane edge function for each node, in the tile binning method according to an exemplary embodiment of the present invention.

FIG. 5 is a diagram illustrating an example of a method of calculating a half plane edge function for each node, in the tile binning method according to an embodiment of the present invention. In the tile binning method according to an exemplary embodiment of the present invention, an identification value of each of tile nodes with respect to each of edges of a triangle is determined. Referring to FIG. 5, a method is illustrated for determining the identification value of each of the tile nodes by calculating a half plane edge function of each of the tile nodes with respect to one edge 510 from edges of a triangle.

As shown in FIG. 5, to calculate an identification value at a tile node 520 with respect to the edge 510, a half plane edge function value at the tile node 520 is calculated. When the half plane edge function value at the tile node 520 is acquired, half plane edge function values of tile nodes adjacent to the tile node 520 may be acquired by using the half plane edge function value at the tile node 520 and Equation 2. In FIG. 5, since the edge 510 slopes towards the bottom right, the half plane edge function value of the tile node 520 has a negative value.

From the tile nodes adjacent to the tile node 520, half plane edge function values of the tile nodes to the left or below are positive values. Accordingly, from node tiles 530 and node tiles 540, half plane edge functions of tile nodes left and below based on the tile node 520 are positive and half plane edge functions of tile nodes right and above are negative.

Accordingly, the identification values of the tile nodes 530 and the tile nodes 540 may be determined. Both of the tile nodes 530 and 540 may be determined by calculating the half plane edge function values with respect to the tile node 520 by using Equation 1 and calculating the half plane edge function values of the adjacent tile nodes by using Equation 2. A process of calculation for determining the identification values may be largely by using the method.

Particularly, when a start tile node with which a process of determining an identification value is started exists close to a straight line, the calculation may be largely reduced. For this, the process of determining the identification value may be started from each tile node of a tile in which three vertexes of a triangle exist. The identification value may be determined with respect to other edges in addition to the edge 510 by using the same method.

Figure 6:
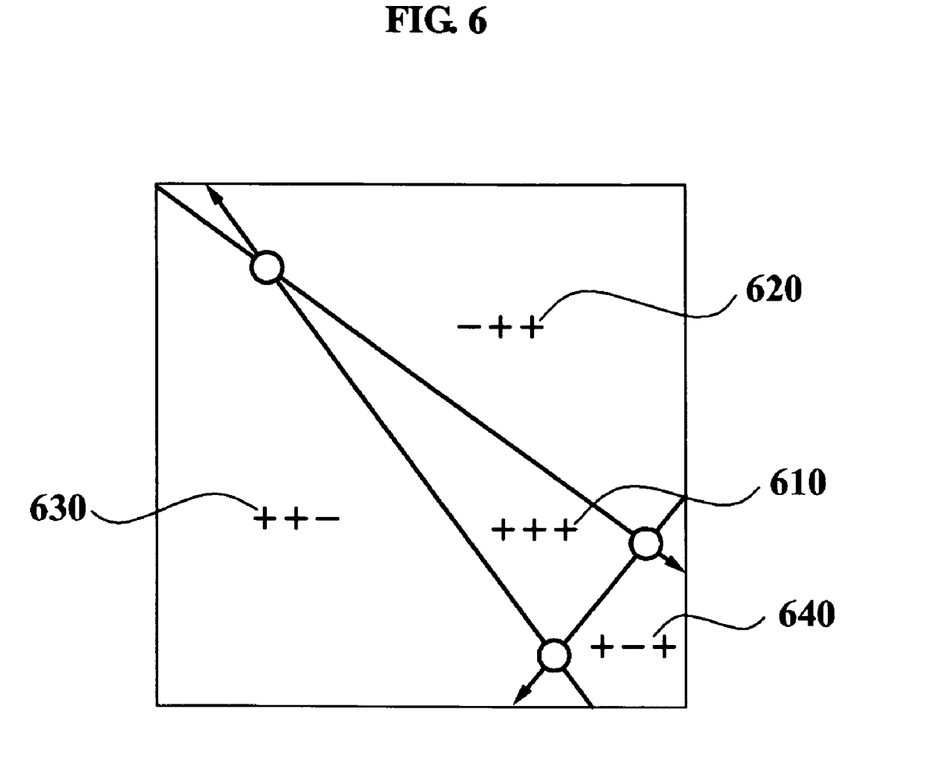
FIG. 6 is a diagram illustrating signs of half plane edge functions within and outside of a triangle.

FIG. 6 is a diagram illustrating signs of half plane edge functions within and outside of a triangle. Referring to FIG. 6, when acquiring a half plane edge function value with respect to each of three edges of a triangle, rotating clockwise, an inside 610 of the triangle has positive values with respect to all of the edges and outsides 620, 630, and 640 of the triangle have a negative half plane edge function value with respect to at least one edge. In the tile binning method according to an exemplary embodiment of the present invention, a tile including an entirety or a part of the triangle may be identified by using the property of the half plane edge function.

Figure 7:
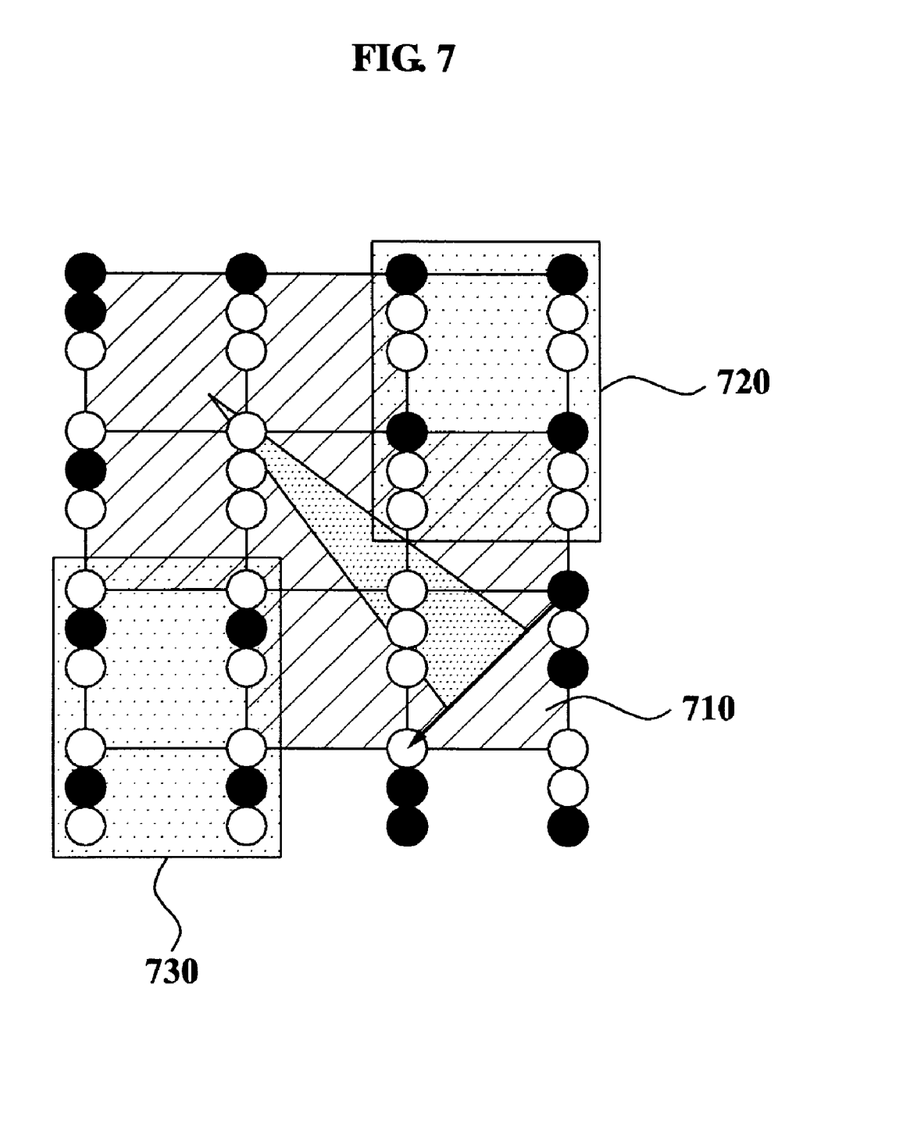
FIG. 7 is a diagram illustrating an example of a method of identifying an entire or a part of a triangle, in the tile binning method according to an embodiment of the present invention.

FIG. 7 is a diagram illustrating an example of a method of identifying an entire or a part of a triangle, in the tile binning method according to an exemplary embodiment of the present invention. Referring to FIG. 7, a tile is divided into a 3×3 grid and a tile including an entirety or a part of a triangle is identified from the divided tiles according to the tile binning method, according to an exemplary embodiment of the present invention. In FIG. 7, three circles shown for each tile node indicate a first identification value, a second identification value, and a third identification value of each tile node. A white circle designates a tile node whose half plane edge function is positive, and a black circle designates a tile node whose half plane edge function is negative.

As shown in FIG. 7, the first identification value, the second identification value, and the third identification value of a tile node included in each of seven tiles included in an area of 710 are not identical, and none of the tile nodes has a positive first identification value, second identification value, or third identification value. However, since all of tile nodes that are four vertexes of a tile of 720 have a negative first identification value and have a positive second identification valued and a positive third identification value, the tile does not include any part of the triangle. Also, since all of tile nodes that are four vertexes of a tile of 730 have a positive first and third identification value and a negative second identification value, the tile does not include any part of the triangle.

As described above, when the identification value of each of the tile nodes is acquired, whether each of the tiles includes the entirety or the part of the triangle may be determined by a simple comparison. Also, since the determination with respect to each of the tiles is does not need to be sequentially performed, all of the tiles may be identified in parallel, thereby largely improving processing speed.

Figure 8:
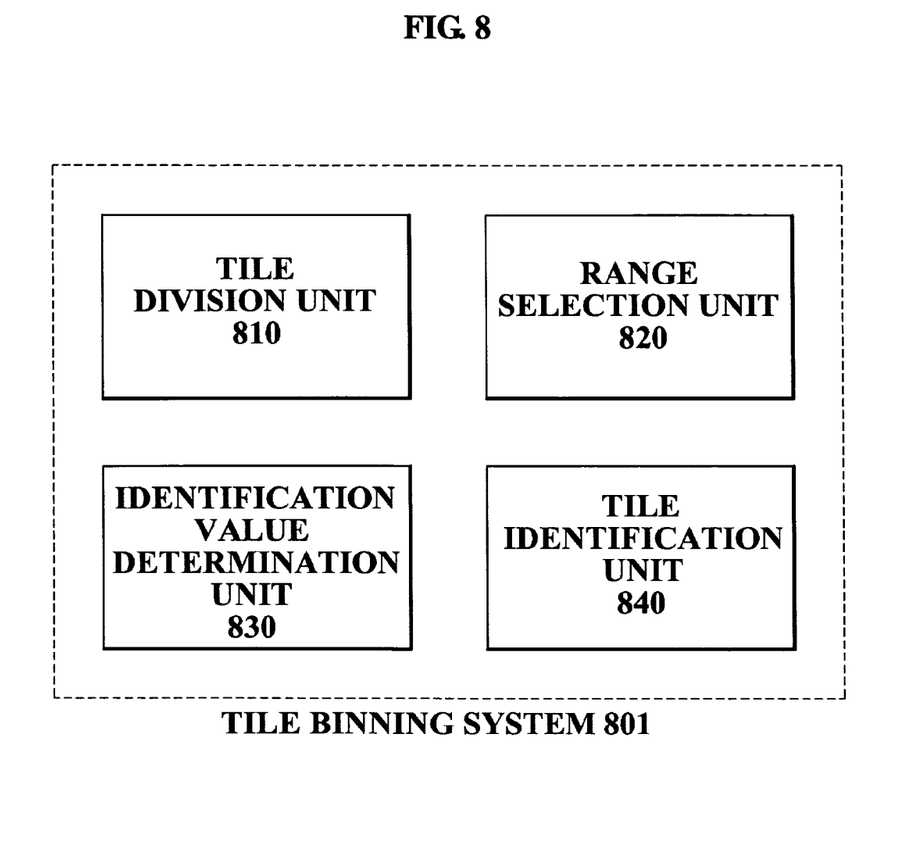
FIG. 8 is a diagram illustrating a configuration of a tile binning system according to an exemplary embodiment of the present invention.

FIG. 8 is a diagram illustrating a configuration of a tile binning system 801 according to an embodiment of the present invention. Referring to FIG. 8, the tile binning system 801 includes a tile division unit 810, a range selection unit 820, an identification value determination unit 830, and a tile identification unit 840. The elements may be embodied as software, hardware, or a form in which software is coupled with hardware and may be connected. Hereinafter, the tile binning system will be described for each element.

The tile division unit 810 divides a scene for performing rendering with respect to a triangle, into a plurality of tiles. A tile is acquired by dividing into a resolution of the scene to be displayed to a user, at a predetermined size. Rendering with respect to an entirety of the scene may be performed by performing rendering for each tile. For example, a scene having a resolution of 640×480 is divided into tiles having a resolution of 32×32, and 20×15 tiles are used for the rendering. When the entirety of the scene is divided into the plurality of tiles, the rendering of the entirety of the scene may be processed by performing the rendering with respect to each of the tiles whose resolution is low.

The range selection unit 820 selects a tile included in a range of a minimal square including the triangle, from the tiles acquired by the division performed by the tile division unit 810. A tile to which the rendering is performed includes an entirety or a part of the triangle. Since a square has more definition than a triangle, the range of the square may be more easily identified. Accordingly, before identifying the tile including the entirety or the part of the triangle, the minimal square including the triangle is acquired and a tile included in the range of the minimal square is identified, thereby largely reducing the number of tiles that become an object of a tile binning process.

The identification value determination unit 830 determines an identification value of a tile node for each of the selected tiles. The tile node may be a vertex of the tile, and the identification value indicates where the tile node is located based on the triangle. Accordingly, when the identification value determination unit 830 determines the identification value, the information where each of four vertexes of the tile is located based on the triangle may be acquired, thereby verifying whether each of the tiles includes the entirety or the part of the triangle.

The identification value determined by the identification value determination unit 830 may include a first identification value, a second identification value, and a third identification value. The first identification value, the second identification value, and the third identification value may be determined based on a sign of a half plane edge function value with respect to each of a first edge, second edge, and third edge of the triangle, at the tile node. For example, when a value of the half plane edge function is a positive number, the first identification value, the second identification value, and the third identification value may be determined to be 1, and when a value of the half plane edge function is a negative number or 0, the first identification value, the second identification value, and the third identification value may be determined to be 0. In this case, different values may be established as the positive number, the negative number, and 0, respectively. As described above, the identification value may be recorded by any one of various methods capable of verifying the sign of the half plane edge function with respect to three edges of the triangle at the each of the tile nodes. The half plane edge function value may be calculated by using Equation 1, and the half plane edge function has the property of Equation 2.

The tile identification unit 840 identifies the tile including the entirety or the part of the triangle from the tiles, based on the identification value of the tile node for each of the tiles, determined by the identification value determination unit 830. Since information on a position of the tile node based on the triangle may be verified by using the identification value of the tile node, determined by the identification value determination unit 830, the tile identification unit 840 may identify whether the tile includes the entirety or the part of the triangle, by using the information on the position of the tile node that is based on the vertex of the tile.

For example, the tile identification unit 840 may identify tiles excluding the tile having the first identification values of tile nodes that are identical, the second identification values that are identical, and the third identification values that are identical and at least one of the first identification value, the second identification value, and the third identification value of one of the tile nodes having a negative number, as the tile including the entirety or the part of the triangle. When the identification value of the tile node for each tile is determined, the above comparison process may be performed in parallel, thereby largely reducing operation time.

As described above, the tile identification unit 840 may determine all of the tile nodes to be included in the triangle when the first identification value, the second identification value, and the third identification value of all of the tile nodes included in the tile are positive and may determine an entirety of the tile to be included in the triangle because the tile nodes are four vertexes of the tile.

Figure 9:
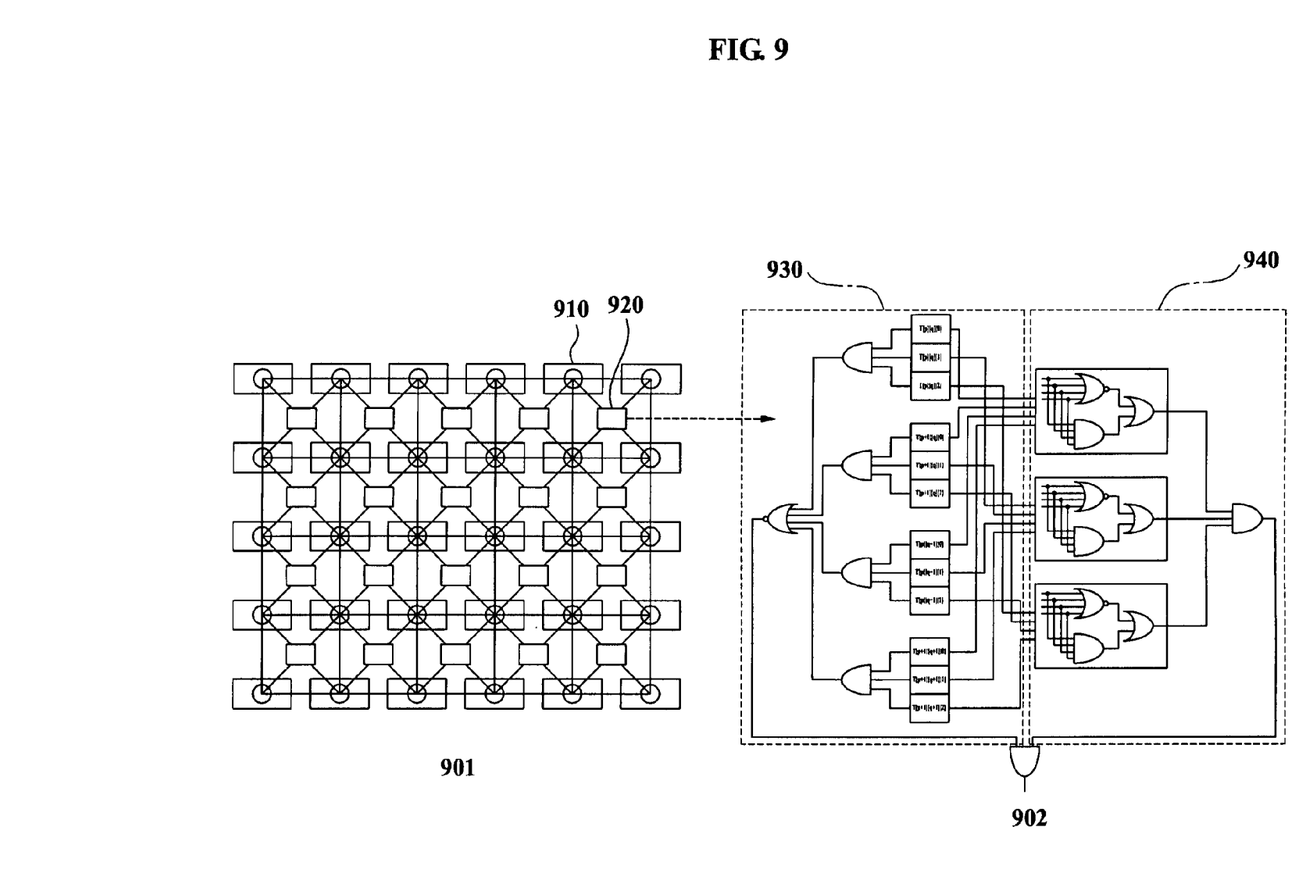
FIG. 9 is a diagram illustrating parallel circuits for determining whether each tile includes an entire or a part of a triangle, in the tile binning system according to an exemplary embodiment of the present invention.

FIG. 9 is a diagram illustrating parallel circuits for determining whether each of tiles includes an entire or a part of a triangle, in the tile binning system according to an exemplary embodiment of the present invention. Referring to FIG. 9, a system 901 is constructed for performing tile binning for each tile, a recording unit 910 stores an identification value for each tile node, and a circuit unit 920 performs the tile binning method by using the value recorded in the recording unit 910. The recording unit 910 has to store a first identification value, a second identification value, and a third identification value at a tile node corresponding to the recording unit 910. The first identification value, the second identification value, and the third identification value indicating signs of half plane edge function values, respectively, may be expressed by one bit. Accordingly, the recording unit 910 may be satisfied with a capacity of three bits.

Also, in an enlarged circuit diagram 902, the circuit unit 920 is illustrated in detail. The circuit unit 920 receives identification values from storages of four tile nodes that can be verified by the circuit unit. The identification value is a binary 1 when an identification value is positive, and is a binary 0 when an identification value is negative. From Left Circuit 930, a binary 0 is outputted when all of the first identification value, the second identification value, and the third identification value of any one of the four tile nodes are a binary 1, or a binary 1 is outputted when all of the first identification value, the second identification value, and the third identification value of any one of the four tile nodes are not a binary 1. In Right Circuit 940, the first identification value, the second identification value, and the third identification values are compared in order from the top. Since a binary 1 is outputted when each of the identification values are identical or a binary 0 is outputted when each of the identification values are not identical, whether the identification values of the four tile nodes are identical may be determined. Accordingly, the circuit unit outputs a binary 1 only when the identification value of any one of the tile nodes of a tile where the circuit unit is installed is not a binary 1 and all of the tile nodes have the same value with respect to each of the identification values. As described above, when removing the tile corresponding when outputting a binary 1, the remaining tiles are the tiles including the entirety or the part of the triangle.

When one circuit is constructed for each tile as described above, simple logic operations are performed in parallel, thereby quickly performing the tile binning.

The multimedia data genre determination method according to the present invention may be embodied, for example, as a program instruction capable of being executed via various computer units and may be recorded in a computer-readable recording medium. The computer-readable medium may include a program instruction, a data file, and a data structure, separately or cooperatively. The program instructions and the media may be those specially designed and constructed for the purposes of the present invention, or they may be of the kind well-known and available to those skilled in the computer software arts. Examples of the computer-readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. Examples of the program instructions include both machine code, such as produced by a compiler, and files containing high-level language codes that may be executed by the computer using an interpreter. The hardware elements above may be configured to act as one or more software modules for implementing the operations of this invention.

Although a few exemplary embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A tile binning method comprising:
    dividing a scene for rendering a triangle, into a plurality of tiles, by a tile division unit;
    determining identification values of tile nodes of each of the tiles, by an identification value determination unit; and
    identifying tiles including an entirety or a part of the triangle, based on the identification value of the tile nodes for each of the tiles, by a tile identification unit,
    wherein at least one of the dividing the scene, the determining the identification values, and the identifying the tiles is performed by a processor;
    the identification values comprise a first identification value, a second identification value, and a third identification value,
    the determining the identification values comprises determining the first identification value, the second identification value, and the third identification value based on a sign of a half plane edge function value for each of a first edge, a second edge, and a third edge of the triangle from the tile nodes, and
    the identifying the tiles comprises identifying the tiles excluding the first identification values of the tile nodes identical with each other, the second identification values of the tile nodes identical with each other, and the third identification values of the tile nodes identical with each other and at least one of the first identification value, the second identification value, and the third identification value of one of the tile nodes being a negative number, as the tiles including the entirety or the part of the triangle.

2. The method of claim 1, wherein the identifying the tile including an entirety or a part of the triangle is performed parallel for all of the tiles.

3. The method of claim 1, further comprising:
    selecting a tile included in a minimal square including the triangle, from the divided tiles,
    wherein, in the determining identification values, an identification value of each of the tile nodes of the selected tile is determined.

4. The method of claim 3, wherein, in the selecting the tile included in a minimal square including the triangle, from the divided tiles, the minimal square including the triangle is acquired based on coordinates of vertices of the triangle.

5. The method of claim 1, wherein the determining the identification values comprises:
    evaluating the half plane edge function value of the first edge of the triangle at a first tile node; and
    evaluating a half plane edge function value of a second tile node adjacent to the first tile node in a predetermined direction, based on the half plane edge function value of the first edge.

6. The method of claim 5, further comprising determining an identification value of a tile node existing in the direction from the second tile node, as an identification value of the second tile node if a sign of the half plane edge function value of the first tile node is different from a sign of the half plane edge function value at the second tile node.

7. The method of claim 5, wherein the first tile node is one of the tile nodes included in the tile including one of the vertices of the triangle.

8. The method of claim 1, further comprising, identifying a tile that is entirely included in the triangle from the tiles, based on the identification values of the tile nodes of the each of the tiles.

9. The method of claim 8, wherein, in the identifying a tile that is entirely included in the triangle, the tile where all of the tile nodes have the first identification value, the second identification value, and the third identification value, which are all positive numbers, is identified as the tile that is entirely included in the triangle.

10. The method of claim 1, wherein the tile node is a vertex of the tile.

11. The method of claim 1, wherein the scene overlaps the triangle and rendering of the triangle is performed only on the tiles which include the entirety or the part of the triangle, based on identifying.

12. At least one non-transitory computer-readable recording medium in which instructions are stored, which instructions, when executed by a computer, cause the computer to execute a tile binning method comprising:
   dividing a scene for rendering a triangle, into a plurality of tiles;
   determining identification values of tile nodes of each of the tiles; and
   identifying tiles including an entirety or a part of the triangle, based on the identification value of the tile nodes for each of the tiles, wherein
   the identification values comprise a first identification value, a second identification value, and a third identification value,
   the determining the identification values comprises determining the first identification value, the second identification value, and the third identification value based on a sign of a half plane edge function value for each of a first edge, a second edge, and a third edge of the triangle from the tile nodes, and
   the identifying the tiles comprises identifying the tiles excluding the tiles having the first identification values of the tile nodes identical with each other, the second identification values of the tile nodes identical with each other, and the third identification values of the tile nodes identical with each other and at least one of the first identification value, the second identification value, and the third identification value of one of the tile nodes being a negative number, as the tiles including the entirety or the part of the triangle.

13. A tile binning system comprising:
   a tile division unit which divides a scene for rendering a triangle, into a plurality of tiles;
   an identification value determination unit which determines identification values of tile nodes of each of the tiles; and
   a tile identification unit which identifies a tile including an entirety or a part of the triangle from the tiles, based on the identification value of the tile nodes for each of the tiles, wherein
   at least one of the tile division unit, the identification value determination unit, and the tile identification unit is implemented by a processor;
   the identification values comprise a first identification value, a second identification value, and a third identification value,
   the identification value determination unit determines the first identification value, the second identification value, and the third identification value based on a sign of a half plane edge function value for each of a first edge, a second edge, and a third edge of the triangle from the tile nodes, and the tile identification unit identifies tiles excluding the tiles having the first identification values of the tile nodes identical with each other, the second identification values of the tile nodes identical with each other, and the third identification values of the tile nodes identical with each other and at least one of the first identification value, the second identification value, and the third identification value of one of the tile nodes being a negative number, as the tiles including the entirety or the part of the triangle.

14. The system of claim 13, further comprising a range selection unit which selects a tile included in a minimal square including the triangle, from the divided tiles;
   wherein the identification value determination unit determines an identification value of each of tile nodes of the selected tile, and
   the range selection unit is implemented by a processor.

* * * * *